Jan. 19, 1965
G. L. LOOMIS
3,165,919
METHOD AND APPARATUS FOR TESTING WELL PIPE SUCH
AS CASING OR FLOW TUBING
Filed Feb. 8, 1962
2 Sheets-Sheet 1
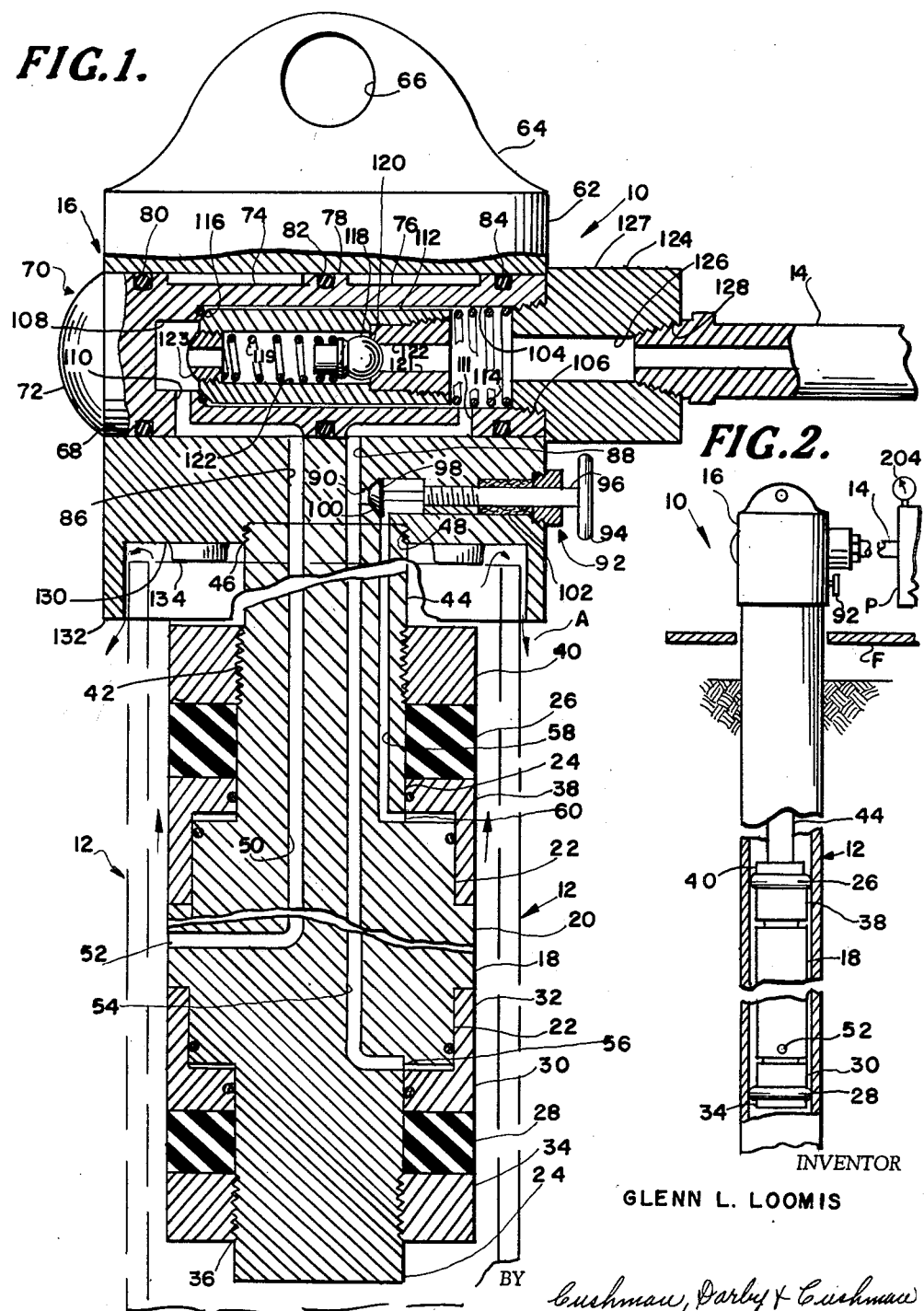
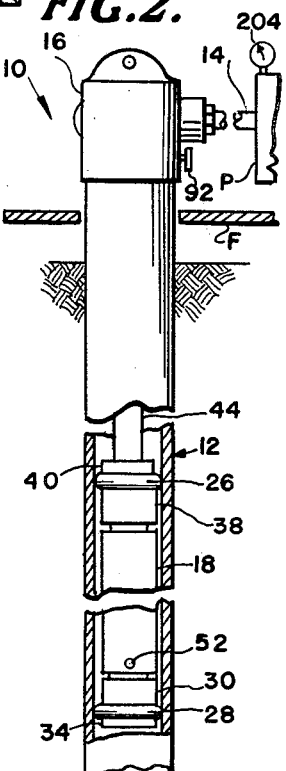
INVENTOR
GLENN L. LOOMIS
BY Cushman, Darby & Cushman
ATTORNEYS

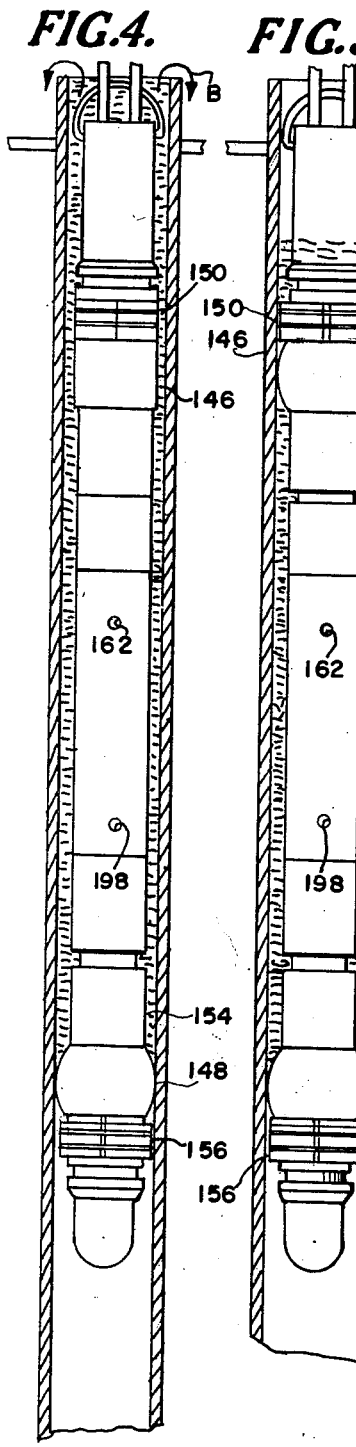
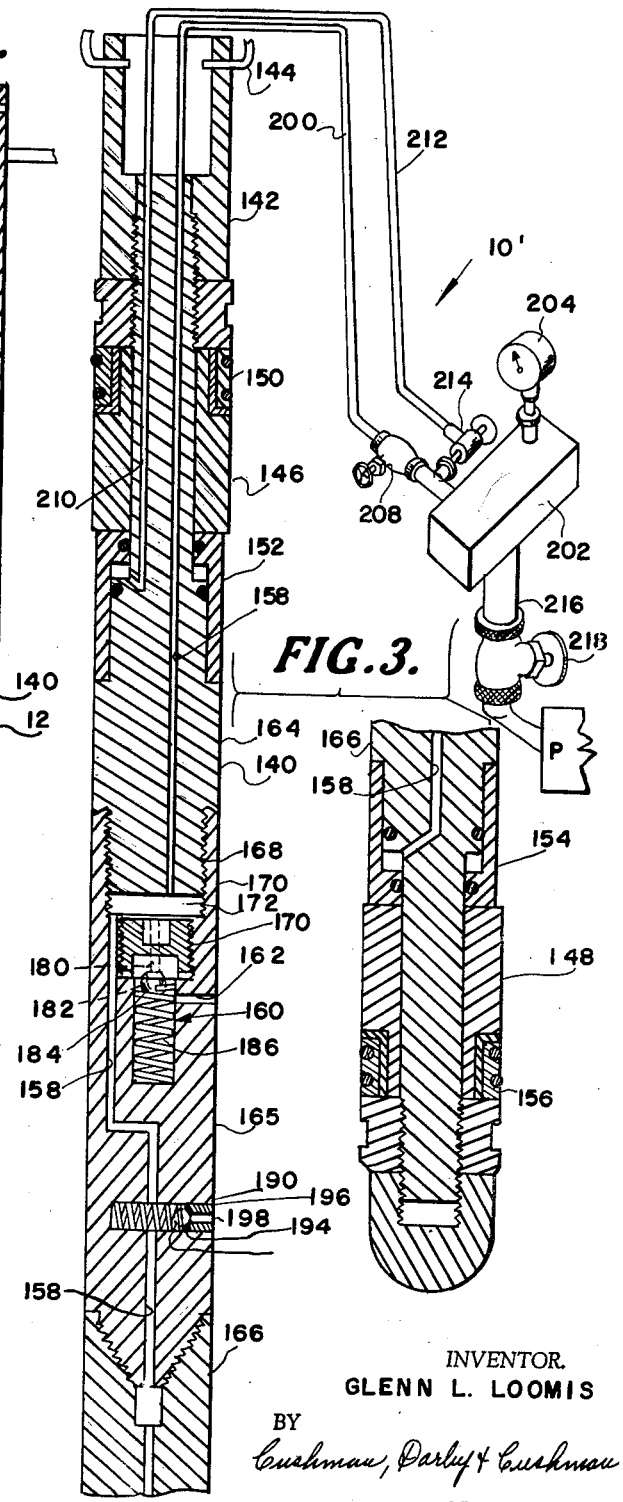

United States Patent Office 3,165,919
Patented Jan. 19, 1965

3,165,919
METHOD AND APPARATUS FOR TESTING WELL
PIPE SUCH AS CASING OR FLOW TUBING
Glenn L. Loomis, P.O. Box 728, Pasadena, Tex.
Filed Feb. 8, 1962, Ser. No. 171,882
16 Claims. (Cl. 73—40.5)

The present invention relates to an improved method and apparatus for testing well tubing or pipe by applying hydraulic pressure to the interior of the same between spaced sealed-off barriers.

Throughout the specification, the term "well pipe" will be used to cover either a string of flow tubing in a well or a casing for the string of flow tubing. In drilling a well, the walls of the hole are supported by what is commonly referred to as casing. The tubular casing, which comes in long sections, is lowered into the well after the well has been drilled, the sections of casing being coupled together in the usual manner by welded joint or a threaded joint. It is customary to test the sections of casing to see if they are leakproof and, oftentimes, the length of several sections of casing are tested at one time.

The flow tubing, which is inserted within the casing, is likewise formed of a plurality of sections coupled together by either a threaded joint or a welded joint, the sections being added at the surface of the well as the string is being made up. Each of the joints of the flow tubing must be tested for leaks as well as the walls of the flow tubing itself.

In my prior United States Patents 2,731,827, issued January 24, 1956; 2,807,955, issued October 1, 1957; and 2,841,007, issued July 1, 1958, there are disclosed well testing apparatus wherein spaced packers on a tester body are expanded simultaneously into engagement with the interior wall of well pipe and then fluid under a measurable pressure is applied to the annular space between the barriers. The pressure of the fluid between the barriers is raised to a predetermined pressure and then it is determined whether or not there is a drop in such pressure over a desired interval of time. Also, the exterior of the pipe is observed to see if any of the fluid is leaking through the walls of the same or through the joint between two sections of the same when the pipe is being tested in derrick or at the rotary table.

With the advent of larger diameter well pipes in the order of 13 inches or more for flow tubing or especially casing, difficulties have arisen in testing the same by apparatus utilizing space barriers simultaneously formed in the pipe with the subsequent application of the testing fluid to the area between the spaced barriers. The testing fluid which is usually water or some other liquid flows into the area and compresses the air in such area. The compressed air creates a dangerous condition especially if the length of well pipe being tested or the joint being tested has a leak. If there is a leak and there is trapped compressed air in the area between the sealed off barriers, a complete rupture of the well pipe oftentimes results causing considerable damage to surrounding equipment and personnel. As the diameter of the pipe increases and the length of the sealed off section increases, the chance of trapping more air becomes even greater. It has been found a small amount of air compressed to only 10,000 pounds per square inch possesses a potential explosion of well pipe if a leak or rupture occurs in the well pipe. The danger is further increased when it is realized that current test pressures for well pipe must sometimes approach and exceed 30,000 pounds per square inch. Further, the trapping of air between the spaced barriers as the test liquid flows into the same provides a cushion for the test liquid and often results in faulty readings in situations where the well pipe being tested has no leaks. When the pressure of the testing liquid is initially brought up to the desired predetermined pressure against a cushion of air, the pressure reading on the gauges will oftentimes drop off due to further compression of the air, thus giving a faulty indication of a leak.

An important object of the present invention is to provide an improved method of and apparatus for testing well pipe wherein all of the air between the barriers is completely evacuated and the space is entirely filled with the testing liquid prior to the application of the measurable test pressure.

Still another object of the present invention is to provide an improved method and apparatus for testing well pipe wherein spaced barriers may be selectively formed in the well pipe so that the area between the barriers when the barriers are both formed is completely filled with liquid and can be evacuated at the end of a test by dropping the liquid by gravity past the lowermost barrier.

Another object of the present invention is to provide an improved method and apparatus for testing well pipe by liquid under pressure which includes forming a first barrier in the well pipe and then filling the area above the barrier with a test liquid until the liquid at least reaches a level above the desired position of a second barrier and then forming the second barrier in the liquid to trap liquid between it and the lower barrier and then applying a predetermined measurable pressure to the liquid between the barriers.

Ancillary to the preceding object, it is a further object of the present invention to provide an improved method and apparatus for testing well pipe wherein the operators have a visual indication when the liquid above the lower barrier has reached a level above the desired position upper barrier.

Still another object of the present invention is to provide an apparatus for testing well pipe having means thereon to protect the operator when liquid flows from the top of the well pipe during a portion of the test procedure.

A still further object of the present invention is to provide an apparatus for testing well pipe including a pressure responsive valve, a pressure relief valve and packer selector valve in a quickly detachable replaceable unit which may be positioned externally of the well pipe being tested.

Another object of the present invention is to provide a tester apparatus adapted to be supported within the well pipe at a predetermined distance from the free end of the well pipe by a head structure incorporating a pressure responsive valve assembly capable of quick disconnection therefrom. By providing the pressure responsive valve assembly for quick disconnection from the head structure, the body of the tester tool does not have to be removed from the well pipe and dismantled in order to repair or replace the pressure responsive valve with another valve of a different spring constant.

Another object of the present invention is to provide a tester apparatus in which the tester body having spaced packer elements thereon may be lowered to any desired depth within a well, the packer elements being selectively operable by valves located at the surface of the well.

These and other objects and advantages of the present invention will appear more fully in the following specification, claims and drawings in which:

FIGURE 1 is a vertical, sectional view of the apparatus of the present invention inserted into a well pipe, the well pipe being illustrated in broken lines;

FIGURE 2 is a schematic view of the apparatus of FIGURE 1 showing the well pipe partly in section, the view being on a reduced scale to that of FIGURE 1;

FIGURE 3 is a vertical sectional view similar to FIGURE 1 but illustrating a modified version of the tester apparatus of the present invention;

FIGURES 4 and 5 illustrate the sequential steps of the method of the present invention, the apparatus shown being that of FIGURE 3 but with the understanding that the sequential steps of the method are substantially the same for the apparatus of FIGURE 1.

Referring now to the drawings wherein like character and reference numerals represent like or similar parts, the tester apparatus of the present invention as illustrated in FIGURES 1 and 2 is generally designated by the numeral 10. The tester apparatus 10 is illustrated positioned in a well pipe 12 which may be casing for a well or it may be flow tubing inserted within the casing. It will be understood that the well pipe 12 is made up of a series of stands or sections coupled together in the derrick or at the rotary table and, as each stand is coupled onto the previous stand, they are lowered into the drilled well hole. The purpose of the tester apparatus 10 is to test the coupling between stands whether it be a welded joint or a threaded joint for leaks at predetermined pressures as well as to test the wall of the pipe sections for leaks.

The improved method of testing the well pipe may be best understood by referring to FIGURES 2, 4 and 5 and will be explained in detail later in the specification. While FIGURES 4 and 5 disclose a slightly modified apparatus to that shown in FIGURE 1, it will be appreciated that the testing method illustrated therein is the same as the improved method of testing with the apparatus of FIGURE 1.

The tester apparatus 10 of FIGURES 1 and 2 includes a pump P suitably supported on the floor F of the derrick (not shown), a flexible conduit 14, a head structure 16 and a tester body 18 for insertion into the well pipe. The elongated tester body 18 has a maximum diameter less than the inside diameter of the well pipe 12 and includes a cylindrical center portion 20, intermediate portions 22 of reduced diameter and end portions 24 of further reduced diameter. The elongated end portions 24 as shown in FIGURE 1 extend upwardly and downwardly from the reduced diameter intermediate portions 22 and are adapted to support upper and lower packer elements 26 and 28 respectively. The resilient packer elements 26 and 28 are made of an elastomeric material such as rubber, synthetic rubber or the like, and are adapted to be compressed longitudinally of the tester body so that they expand transversely into sealing engagement with the wall of the well pipe 12.

In more detail, the lower end portion 24 is provided with a cylindrical cup-shaped piston 30 having a skirt 32 slidable on the intermediate portion 22. The packer 28 fits onto the end portion 24 and abuts a back-up nut 34 threaded onto the end portion, as indicated at 36. It will now be understood that when the piston 30 moves downwardly, as viewed in FIGURE 1, it will compress the packer 28 against the back-up nut or ring 34 to cause the same to expand transversely into engagement with the wall of the well pipe 12. The upper packer element 26 is mounted in a similar manner between a cylindrical cup-shaped piston 38 and a backup nut or ring 40 threaded onto the upper end portion 24, as indicated at 42. Movement of the piston 38 upwardly compresses the packer element 26 against the back-up nut 40 and thus expands the packer element transversely into sealing engagement with the inside of the end of the well pipe.

The upper end portion 24 is provided with an elongated stem 44 threaded at its upper end, as indicated at 46. The head structure 16 is provided with complementary threads 48 for threadedly receiving the threads 46. While the connection of the head structure to the elongated stem 44 has been shown as a threaded connection, it will be appreciated that the head structure may be connected to the elongated stem 44 in any suitable manner.

The elongated tester body 18 is provided with a first fluid passageway 50 extending from the end of and through the elongated stem 44 and terminating in a port or opening on the periphery of center portion 20, as indicated at 52 intermediate the upper and lower packer elements 26 and 28, respectively. A second fluid passageway 54 extends from the end of and through the elongated stem 44 of the tester body 18 and opens to an area beneath the head of the piston 30, as indicated at 56. A third fluid passageway 58 also extends from the end of and through the elongated stem 44 of the tester body 18 and opens to the area beneath the head of the upper piston 38, as indicated at 60.

While the packer elements disclosed above are of the type which are actuated by fluid pressure causing the movement of the pistons against the same, it will be appreciated that the packer structures may be of the type inflatable directly by fluid pressure such as shown in my aforementioned Patent 2,807,955 or of the type shown in my aforementioned Patent 2,841,007. Each of the packers referred to in the aforementioned patents as well as the packers disclosed herein may be referred to as fluid expansible packers in that hydraulic fluid pressure is utilized as a means of causing the expansion of the packers into sealing engagement with the wall of the well pipe.

The head structure 16 includes a generally cylindrical body member 62 having a flange 64 at the top thereof with an aperture 66 therein for receiving suitable hoisting or supporting apparatus (not shown). The cylindrical body member 62 of head structure 16 is provided with a transversely extending bore 68 which is adapted to receive a pressure responsive and pressure relief valve unit generally designated by the numeral 70. The unit 70 includes a plug element 72 having a pair of spaced annular grooves 74 and 76 on its periphery separated by a land 78. Also on the periphery of the plug element 72 are grooves for receiving O-rings or packings 80, 82 and 84, respectively. As will now be apparent, the O-rings 80, 82 and 84 provide fluid pressure seals to separate the annular grooves 74 and 76 from each other and from the outside of the head structure 16.

The head structure 16 is also provided with a first passageway 86 opening at one end to the bore 68 at a position in communication with the annular groove 74 and at the other end to a position where it is in alignment with the passageway 50 of the stem 44 when the head structure 16 is attached thereto. A second passageway 88 is provided in the head structure and opens at one end to the bore 68 in a position where it communicates with the annular groove 76 and at its other end at a position where it is in alignment with the passageway 54 in the stem 34. A third passageway 90 in the head structure 16 provides communication between the passageway 88 in the head structure 16 and the passageway 58 in the stem 44. A selector valve 92 is provided in the passageway 90 so that the passageway 90 may be selectively opened or closed to the flow of fluid. The selector valve 92, as shown in FIGURE 1, is a stem type of valve having an operating handle 94, a valve stem 96 thereon and a valve element 98 for cooperating with a valve seat 100 in the passageway 90. A suitable packing 102 is provided around the stem 96 to prevent leakage to the outside of the head structure 16.

The plug element 72 is provided with a bore 104 open at one end and internally threaded, as indicated at 106, the bore 104 terminating in a counterbore 108 of reduced diameter. Counterbore 108 communicates with the annular groove 74 by means of a laterally extending passageway 110 whereas the other end of bore 104 communicates with the annular groove 76 by a laterally extending passageway 111.

A sleeve valve 112 is slidable within bore 104 and is resiliently urged toward the left, as viewed in FIGURE 1, by means of a spring 114. The sleeve valve 112, which has an outside diameter less than the bore 104, is adapted to seat against an annular seat 116 provided on the shoulder between the counterbore 108 and the bore 104. A pressure responsive ball valve 118 is provided within the sleeve valve 112, the ball valve 118 being urged toward the right of FIGURE 1 by a spring 119 against a seat 120 provided in a tubular fitting 121 carried in a longitudinal passageway 122 of the sleeve valve. A second tubular fitting 123 carried in the passageway 122 at the opposite end thereof provides a seat for one end of the spring 119 whereas the other end urges a follower 125 against the ball.

A fitting 124 is threadedly received in the threads 106 of bore 104. The fitting 124 is provided with a passageway 126 therethrough which is adapted to receive the threaded end 128 of the flexible conduit 14. Fitting 124 has an enlarged head 127 which provides an annular shoulder for abutting against the outside of the head structure 16.

It will now be obvious that the entire unit 70 may be quickly and easily removed from the head structure 16 by pulling to the right on fitting 124. When the unit 70 is in the position shown, it needs no positive means for retaining the same in the head structure 16, as the hydraulic pressure of the liquid flown through the flexible conduit 14 will always tend to urge the unit 70 toward the left of FIGURE 1 with head 127 providing a positive stop.

The body member of the head structure 16 is provided with a downwardly facing surface 130 having an annular flange 132 extending downwardly therefrom. The internal diameter of the flange 132 is greater than the outside diameter of the well pipe 12 so that the well pipe may loosely fit within the same. As shown in FIGURE 1, a plurality of lugs 134 are provided on the surface 130 for abutting against the end of the well pipe 12 when the head structure is positioned on the well pipe with the tester body inserted into the well pipe. The purpose of the lugs or abutments 134 is so that the end of the well pipe does not make a seal with the head structure 16 and thus liquid can escape outwardly and downwardly, as indicated by the arrows A. A more detailed description of the escape of liquid and its function in the method will be discussed when the method is described. It will be obvious at this time that the flange 132 will cause the liquid escaping to flow downwardly along the outside of the pipe and thus protect the operating crew during this phase of the testing method.

The tester apparatus 10, described above and shown in FIGURE 1, will test a section of well pipe determined by the distance between the packers 26 and 28 on the tester body 18 at a location within the well pipe, as determined by the length of the elongated stem 44. By changing the length of the stem 44, the tests can be conducted at various locations within the well pipe. On the other hand, a change in longitudinal length of a section being tested may be accomplished by utilizing a tester body having the packer elements spaced further apart or closer together.

Referring now to FIGURE 3, a modified form of tester apparatus 10' is illustrated. The tester apparatus 10' is adapted to be lowered into well pipe 12 and perform a test on the same at any desired location. In other words, the tester apparatus 10' may be used to test casing or flow tubing in a completed well as it may be lowered all the way down into the well. It will be understood the tester apparatus 10' may be used similarly to the tester apparatus 10 in that tests may be conducted in well pipe in the derrick or at the rotary table. Unlike the tester apparatus in FIGURE 1 in which a head structure is provided for supporting on the upper end of the well pipe, the tester apparatus 10' is provided with an elongated tester body 140 having a coupling 142 threaded on its upper end, the coupling 142 being provided with a bail 144 thereon for suspension from suitable hoisting means. While the testing apparatus 10' is shown with a bail for a means of support to lower the tester body 140 into the well, it will be understood that other suitable means of supporting the tester body may be used such as shown in my aforementioned Patent 2,731,827.

The tester body 140 is provided on its upper end portion with an upper packer element 146 and on its lower end portion with a lower packer element 148. The packer element 146 is interposed between a segmental back-up ring 150 and a piston 152 whereas the lower packer element 148 is interposed between a piston 154 and a segmental back-up ring 156. The piston elements, packer elements and expansible packer back-up rings are identical to those disclosed in my copending United States patent application Serial No. 754,197, filed August 11, 1958, and entitled "Tester Apparatus for Oil Wells or the Like," and, therefore, the disclosure of said application is incorporated by reference herein.

The tester body 140 is provided with a first fluid passageway 158 extending generally longitudinally from its upper end through the same and opening at its lower end to the area beneath the head of the lower piston 154. A pressure responsive valve generally designated at 160 is provided in the tester body 140 and is adapted to open and close a passageway 162 extending from the outside of the body member 140 to the passageway 158.

In more detail, the tester body 140 is made up of a series of sections 164, 165 and 166 suitably threaded to one another, as shown in FIGURE 3. The section 164 is provided with a male fitting 168 receivable in female fitting 170 of section 165. A chamber or cavity 172 is provided between the end of the section 164 and the section 165, the chamber or cavity receiving a fitting 170 having a passageway 180 therethrough terminating in a valve seat 182. A ball valve 184 is urged against the seat 182 by a compression spring 186. The passageway 158 extends along the outside of the section 165, as indicated at 158' so that when liquid flows through passageway 158 it will normally by-pass the ball valve 184 and flow directly to the area beneath the head of piston 154. After the piston 154 has expanded the packer element 148 into engagement with the wall of the well pipe and the pressure in the passageway 158 is built up sufficiently, then the ball 184 will become unseated and liquid can flow through the passageway 180 to the passageway 162 externally of the tester body.

Section 165 is also provided with a pressure relief valve 190 which is of the one-way ball type and includes a ball 192 urged against a valve seat 194 provided in the fitting 196 having a passageway 198. It will now be apparent that when the pressure of liquid outside of the body member 140 is greater than pressure of the liquid in the passageway 158, the ball 192 will be urged off its seat so liquid can flow into the passageway 158.

Connected to the passageway 158 at the upper end of the tester body 140 is a flexible conduit 200 which leads to a manifold head 202 having a suitable pressure gauge 204 thereon. The flexible conduit 200 is provided with a selector valve 208.

A second passageway 210 extends from the upper end of the tester body 140 and opens to the area beneath the head of the upper piston 152. The upper end of passageway 210 is connected to a second flexible conduit 212 which extends to the manifold head 202 through a selector valve 214. While the flexible conduits 200 and 212 have been illustrated as extending separately to the manifold head 202, they could be arranged concentrically of one another and be used to support the tester body 140 as it is lowered or raised in the well pipe. The manifold head 202 is suitably connected to a source of fluid pressure such as the pump P by means of a conduit 216 having a selector valve 218 therein.

Assuming that the tester body 140 has been lowered into the well pipe 12, as shown in FIGURE 4, to a desired location, the selector valve 214 in conduit 212 is closed and the selector valve 208 in conduit 200 is opened. Then the valve 218 can be opened to allow the testing liquid such as water or the like to be pumped through the conduit 200 to the passageway 158 at a pressure sufficient to actuate the piston 154 to cause the packer element 148 to expand into sealing engagement with the wall of the well pipe. The pressure necessary to cause the actuation of the piston 154 and the expansion of the packer 148 is less than the pressure necessary to open the valve 160. When it is determined that the packer 148 is in tight sealing engagement with the wall of the well pipe, then the pressure is increased sufficiently to allow the liquid to act against the ball 184 and unseat the same, and thus the liquid flows to the exterior of the tester body 140 above the lower packer 148. The liquid is pumped in until it completely fills the annular space between the wall of the well pipe and the tester body so as to drive out any drilling mud, air or other fluid. Usually the test is conducted in the area of the rotary table and enough testing liquid is allowed to flow into the area above the packer element 148 until it flows from the top of the well pipe, as indicated by the arrows B in FIGURE 4. When the liquid is flowing from the top of the well pipe, the operators are assured that all the air or mud or the like has been driven from the area to be tested. The operators can also be assured the area between the packer elements is completely evacuated of fluids other than the test liquid by knowing how much liquid is pumped through the tester body. When the area to be tested is completely filled with the test liquid and the liquid level is at least above the upper packer element, the operator opens the selector valve 214 which will allow liquid under pressure from the manifold head 202 to flow through the conduit 212 to the area beneath the head of the upper piston 152. This causes the upper piston 152 to extend compressing the packer 146 longitudinally and expanding the same transversely into sealing engagement with the wall of the well pipe. When the packer 146 has made sealing engagement with the well pipe, as shown in FIGURE 5, it will be noted that the annular space between the well pipe and the tester body 140 is completely filled with testing liquid. The pressure on the liquid is then further increased until it reaches the desired testing pressure. The system is then closed to trap the test pressure in the same and then the gauge 204 is observed over a predetermined interval of time to see if there is any appreciable drop in pressure.

After the test is completed, the pressure on the liquid in system is relieved and thus the pressure of the liquid between the packers externally of the tester body 140 will be greater than the pressure within the tester body. This pressure will cause the pressure relief valve 192 to unseat and liquid flows toward the inside of the tester body at least until the pressure is equalized on the inside and outside of the tester body. The pressure beneath the piston heads is relieved and thus the pistons assume their relaxed position and any liquid left in the test area drops by gravity past the lower packer element into the well. The testing apparatus may then be relocated to a different location in the well pipe and the test repeated or it may be removed from the well pipe and another stand of well pipe added. The apparatus is then reinserted in the well pipe to test the joint of the newly added stand.

By providing the valve 208 in the line 200, it will now be understood that the upper packer element 146 may be set initially by closing valve 208 and opening valve 214. Also, both valves 208 and 214 may be opened prior to the opening of valve 218 and thus both packers may be simultaneously expanded into engagement with the well pipe if such a procedure is desired when testing.

Referring back to FIGURES 1 and 2, the operation of the apparatus disclosed therein is substantially the same as that described with respect to FIGURES 4 and 5. In FIGURE 1, when it is desired to initially set the lower packer element 28, the selector valve 92 is moved to the closed position (as shown). The pump then pumps liquid under pressure through the conduit 14 to the head structure 16 at a pressure insufficient to unseat the ball 118 from the seat 120 but sufficient to set the lower packer element 28. The liquid flows through the passageways 111, 88 and 54 to the area beneath the lower piston and extends the lower piston causing the packer element to expand into sealing engagement with the wall of the well pipe. When this is accomplished, the pressure on the liquid is increased sufficiently to cause the ball 118 to unseat. The liquid then flows past the ball 118 through the tubular sleeve element 112, passageways 110, 86, 50 and out of the port 52 to the space above the sealed packer 28. The liquid is permitted to continue to flow out of the port 52 until it passes upwardly and over the ends of the well pipe 12. The downwardly depending flange 132 directs the liquid downwardly and away from the operator.

As soon as the operator sees the liquid coming out from beneath the flange 132, the selector valve 92 is backed off of its seat so that liquid can flow through the passageway 90 to the passageway 58 and beneath the head of the upper piston 38, thus causing the upper piston 38 to expand the packer element 26 into sealing engagement with the wall of the well pipe. Here again, all of the air, drilling mud, or other fluids have been evacuated from the test area and only testing fluid has been trapped between the sealed packers. The pressure on the liquid flowing through the conduit 114 is increased to a predetermined test pressure and then the gauge 204 is observed for an interval of time to see if there is a dangerous drop in pressure which would indicate a leak.

After the test has been completed, the pressure in the conduit is relieved and thus the pressure on the outside of the tester body 18 between the packers prior to the packers becoming relaxed is greater than the pressure on the inside of the tool This pressure which is reflected in the pasageways 50, 86, 110 and counterbore 108 will cause the sleeve element 112 to move toward the right of FIGURE 1 against the spring 114 thus unseating the sleeve element from its seat 116 so that the pressure externally of the tester body is relieved. The packers then relax and any liquid left externally of the tool will fall past the lower packer into the well pipe.

While the method and tester apparatus described above fully accomplish the objects and advantages of the present invention, it is, of course, within the scope of the present invention that certain changes and modifications may be made without departing from the spirit of the invention. Therefore, the terminology used in this specification is for the purpose of description and not for limitation, as the scope of the invention is defined in the claims.

What is claimed is:

1. A method of testing at least a portion of the length of a well pipe for leaks while the well pipe is in a vertical position with a testing tool having spaced packers thereon comprising the steps of: positioning the testing tool in the well with the packers located respectively below and above the ends of the portion of length of well pipe to be tested; establishing a fluid pressure tight barrier within the well pipe with the packer positioned below the portion of length to be tested; flowing a testing liquid in a confined state into the well pipe and discharging the same above the established barrier in order to fill the well pipe upwardly from the established barrier past the upper packer so as to completely evacuate the area of the portion of length to be tested of other fluids and to fill the same with the testing liquid; establishing a second fluid pressure barrier in the well pipe with the upper packer and trapping a column of the testing liquid between the established barriers; then applying a measurable pressure to the testing liquid between the barriers to subject the interior of the pipe therebetween to a predetermined hydraulic pressure and observing whether there is a decrease in pressure; and then releasing the barriers to allow the testing liquid therebetween to fall by gravity within the well pipe past the lower packer.

2. A method of testing at least a portion of the length of a well pipe for leaks while the well pipe is in a vertical position with a testing tool having spaced packers thereon comprising the steps of: positioning the testing tool in the well with the packers located respectively below and above the ends of the portion of length of well pipe to be tested; establishing a fluid pressure tight barrier within the well pipe with the packer positioned below the portion of length to be treated; filling the well pipe above the established barrier with a testing liquid by flowing the testing liquid in a confined state into the well pipe through the upper packer and discharging the same above the established barrier until the testing liquid flows out of the top of the well pipe; establishing a second fluid pressure tight barrier in the well pipe with the upper packer and trapping a column of the testing liquid between the established barriers; then applying a measurable pressure to the testing liquid between the barriers to subject the interior of the pipe therebetween to a predetermined hydraulic pressure and observing whether there is a decrease in pressure; and then releasing at least the lower packer to allow the testing liquid in the pipe to fall by gravity within the same past the lower barrier.

3. A method of testing at least a portion of the length of a well pipe with a testing fluid under pressure for leaks while the well pipe is in a vertical position with a testing tool having spaced packers thereon comprising the steps of: positioning the testing tool in the well with the packers located respectively below and above the ends of the portion of length of well pipe to be tested; establishing a fluid pressure tight barrier within the well pipe with the packers positioned below the portion of length to be tested; evacuating the interior of the well pipe above the barrier of fluids other than the testing fluid while simultaneously flowing testing fluid centrally thereof in a confined state through the upper packer and then into the well pipe above the established barrier until it reaches a level at least above the portion of length to be tested; establishing a second fluid pressure tight barrier in the well pipe within the testing fluid by the packer position vertically above the first barrier and at least above the portion of length to be tested; then applying a measurable pressure to the testing fluid between the barriers to subject the interior of the pipe therebetween to a predetermined hydraulic pressure and observing whether there is a decrease in pressure; relieving the measurable pressure on the testing fluid between the barriers; and then releasing at least the lower packer to allow the testing fluid in the pipe to fall by gravity within the same past the lower packer.

4. A method of testing at least a portion of the length of a well pipe with a testing fluid for leaks while the pipe is in a vertical position with a testing tool having spaced packers thereon comprising the steps of: positioning the testing tool in the well with the packers located respectively below and above the ends of the portion of length of well pipe to be tested; establishing a fluid pressure tight barrier within the well pipe with the packer positioned below the portion of length to be tested; evacuating the area in the well pipe above the barrier upwardly and out of the upper end of the well pipe while simultaneously flowing testing liquid centrally thereof in a confined state through the upper packer and then into the well pipe above the established barrier, continuing the flowing of the testing liquid until the testing liquid flows upwardly past the upper packer and out of the top of the well pipe; establishing a second fluid pressure tight barrier in the well pipe within the testing fluid with the upper packer; then applying a measurable pressure to the testing fluid between the barriers to subject the interior of the pipe therebetween to a predetermined hydraulic pressure and observing whether there is a decrease in pressure; relieving the measurable pressure on the testing fluid between the barriers; and then releasing the packers to allow the testing fluid in the well pipe to fall by gravity within the same past the lower packer.

5. In an apparatus for testing at least a portion of the length of a well pipe for leaks; an elongated tester body of smaller diameter than the inside diameter of the well pipe for insertion therein; at least one upper and one lower packer element mounted exteriorly on the upper and lower end portions of said tester body and each having a smaller diameter than the inside diameter of the well pipe when in a relaxed position; a first fluid pressure operated means to set one of said packer elements in sealing engagement with the wall of the well pipe while the other of said packer elements remains relaxed; means to flow a testing liquid through said tubular body after said one packer is set and including a passageway opening to the exterior of said tubular body intermediate said upper and lower packer element; a second fluid pressure operated means independently operable with respect to said first means to set the other of said packer elements; and means to apply a measurable pressure to the liquid flowing through said passageway when both of said packers are set.

6. In an apparatus for testing at least a portion of the length of a well pipe for leaks: an elongated tester body of smaller diameter than the inside diameter of the well pipe for insertion therein; at least one upper and one lower packer element mounted exteriorly on the upper and lower end portion of said tester body and each having a smaller diameter than the inside diameter of the well pipe when in a relaxed position; a first fluid pressure operated means to set the lower packer element in sealing engagement with the wall of the well pipe while the upper packer element remains relaxed; means to flow a testing liquid through said tubular body after said lower packer element is set and including a passageway opening to the exterior of said tubular body intermediate said upper and lower packer elements; a second fluid pressure operated means independently operable with respect to said first means to set the upper packer element in sealing engagement with the wall of the well pipe after the testing liquid has filled the space above the lower packer element to a level at least above the upper packer element; and means to apply a measurable pressure to the liquid trapped between said upper and lower packer elements when the same are set.

7. The apparatus of claim 6 including an elongated stem of reduced diameter extending from the upper end of said tester body; a head carried on the upper end of said stem, said head having an annular downwardly depending skirt, said skirt having a greater diameter than the outside diameter of the well pipe whereby the upper end of the well pipe may be received therein and engaged by the head to support the tester body within the well pipe.

8. The apparatus of claim 7 wherein said means to set the lower packer element includes a liquid passageway through said head and said tubular body opening adjacent said lower packer element for supplying liquid under pressure thereto and wherein said means to set up the upper packer includes a passageway communicating with the passageway in said head and extending through said head and said tester body and opening adjacent the upper packer element, and a valve selectively operable to open said last-mentioned passageway to flow of liquid under pressure to said upper packer element.

9. In an apparatus for testing at least a portion of the length of a well pipe for leaks: an elongated tester body of smaller diameter than the inside diameter of the well pipe for insertion therein; at least one fluid expansible packer element mounted exteriorly of the upper end of said tester body; at least one fluid expansible packer element mounted exteriorly on the lower end portion of said tester body, both of said packer elements having a relaxed diameter smaller than the inside diameter of the well pipe; a source of fluid under pressure; a first conduit operatively connected to said source of pressure and including a passageway in said tester body opening adjacent said lower packer element; a second conduit operatively connected to said source of pressure and including a second passageway in said tester body opening adjacent said upper packer element; valve means in said second conduit selectively operable to open and close the same to fluid under pressure from said source, and means coupled to said first conduit for supplying fluid under pressure exteriorly of said tester body intermediate said packer elements and when said first packer element is set, said last-mentioned means including a pressure responsive valve operable to open position at a predetermined pressure higher than fluid pressure in said first conduit necessary to set said lower packer element.

10. The apparatus of claim 9 including an elongated stem of reduced diameter extending from the upper end of said tester body; a head carried on the upper end of said stem, said head having an annular downwardly depending skirt, said skirt having a greater diameter than the outside diameter of the well pipe whereby the upper end of the well pipe may be received therein and engaged by the head to support the tester body within the well pipe; and wherein said head houses a portion of said first and second conduits and said first-mentioned valve and said pressure responsive valve.

11. The apparatus of claim 9 wherein said first and second conduits include flexible portions extending from said tester body to said source of fluid pressure and wherein said valve in said second conduit is connected in the flexible portion of the same.

12. The apparatus of claim 11 wherein said pressure responsive valve is positioned in said tester body.

13. In an apparatus for testing at least a portion of a well pipe for leaks: an elongated tester body of smaller diameter than the inside diameter of the well pipe for insertion therein; at least one fluid expansible packer element mounted exteriorly on the upper end portion of said tester body; at least one fluid expansible packer element mounted exteriorly on the lower end portion of said tester body, both of said packer elements having a relaxed diameter smaller than the inside diameter of the well pipe; an elongated stem extending upwardly from the upper end portion of said tester body; a first fluid passageway extending from the upper end of said stem through said tester body and opening to the exterior of said tester body intermediate said upper and lower packer elements, a second passage extending from the upper end of said stem through said tester body and open adjacent the lower packer element for applying fluid thereto to expand the same, and a third passage extending from the upper end of said stem through said tester body and opening adjacent the upper packer for applying fluid to expand the same; a head structure detachably carried on the upper end of said stem, said head structure having an open bore therethrough; a plug in said bore, said plug having a pair of annular peripheral grooves spaced longitudinally of each other and separated by a land, one of said grooves communicating with said first passageway and the other of said grooves communicating with said second passageway, said plug having a bore therethrough terminating at one end in a counterbore having a reduced diameter, said counterbore being in communication with said one annular groove; a sleeve valve slidable in said bore and a valve seat for said sleeve valve adjacent said counterbore; means to resiliently urge said sleeve valve against said valve seat; a pressure responsive valve carried by said sleeve valve and operable at a predetermined pressure for allowing fluid to flow through said sleeve valve into said counterbore; and valve means in said head structure and selectively operable to place said third passage in communication with the other of said annular grooves.

14. The apparatus of claim 13 including an enlarged fitting threadably receivable in the open end of the bore of said plug, said fitting having a diameter greater than the diameter of said plug and having a passage therethrough adapted for connection to a conduit from a suitable source of fluid pressure.

15. The apparatus of claim 13 wherein said head structure includes a downwardly depending annular flange having an inside diameter greater than the outside diameter of the pipe to be tested whereby said tester body may be inserted into the pipe and supported by the end of the pipe bearing against said head structure.

16. The apparatus of claim 15 including means provided on the surface of said head structure for engaging the end of the well pipe to prevent the end of the well pipe from making a seal with said head structure.

References Cited by the Examiner
UNITED STATES PATENTS 2,981,331   4/61   Arterbury _____ 73—40.5 X
3,048,998   8/62   Gilreath _____ 73—40.5

ISAAC LISANN, *Primary Examiner.*